(12) United States Patent
BenHanokh et al.

(10) Patent No.: US 11,880,262 B2
(45) Date of Patent: Jan. 23, 2024

(54) REDUCING POWER CONSUMPTION BY PREVENTING MEMORY IMAGE DESTAGING TO A NONVOLATILE MEMORY DEVICE

(71) Applicant: RED HAT, INC., Raleigh, NC (US)

(72) Inventors: Gabriel BenHanokh, Tel-Aviv (IL); Adam Kupczyk, Tulce (PL)

(73) Assignee: RED HAT, INC., Raleigh, NC (US)

( * ) Notice: Subject to any disclaimer, the term of this patent is extended or adjusted under 35 U.S.C. 154(b) by 55 days.

(21) Appl. No.: 17/536,483

(22) Filed: Nov. 29, 2021

(65) Prior Publication Data
US 2023/0168730 A1    Jun. 1, 2023

(51) Int. Cl.
*G06F 1/32* (2019.01)
*G06F 1/3234* (2019.01)

(52) U.S. Cl.
CPC .................. *G06F 1/3275* (2013.01)

(58) Field of Classification Search
CPC ...................................... G06F 1/3275
See application file for complete search history.

(56) References Cited

U.S. PATENT DOCUMENTS

| | | | |
|---|---|---|---|
| 9,519,540 B2 | 12/2016 | Atkisson et al. | |
| 9,588,891 B2 | 3/2017 | Atkisson et al. | |
| 9,836,404 B2 | 12/2017 | Ummadi et al. | |
| 10,970,210 B2 | 4/2021 | Benhanokh et al. | |
| 2008/0082752 A1* | 4/2008 | Chary | G06F 1/32 711/118 |
| 2019/0286369 A1 | 9/2019 | Liu et al. | |

OTHER PUBLICATIONS

What Is Storage-Class Memory?, Pure Storage, retrieved from the internet at <https://web.archive.org/web/20210801021349/https://www.purestorage.com/knowledge/what-is-storage-class-memory.html>, 6 pages, Aug. 1, 2021 (Year: 2021).*

Choi, W., et al., "Exploiting Data Longevity for Enhancing the Lifetime of Flash-based Storage Class Memory," Pennsylvania State University and Yonsei University, 2017, https://arxiv.org/pdf/1704.05138.pdf.

Lee, E., et al., "Reducing Write Amplification of Flash Storage through Cooperative Data Management with NVM," IEEE, 2016, https://ieeexplore.ieee.org/document/7897087.

* cited by examiner

*Primary Examiner* — Stefan Stoynov
(74) *Attorney, Agent, or Firm* — Kilpatrick Townsend & Stockton LLP

(57) ABSTRACT

Power consumption can be reduced by preventing a memory image from being destaged to a nonvolatile memory device. For example, a system can determine, subsequent to a computing device being in a first power mode and having a memory image stored in a first nonvolatile memory device that performs a caching function, that the computing device is in a second power mode that is a higher power mode than the first power mode. The system can, in response to determining that the computing device is in the second power mode, generate a first command to store the memory image in a volatile memory device and prevent the memory image from being stored in a second nonvolatile memory device. The system can, in response to generating the first command, store the memory image in the volatile memory device.

17 Claims, 3 Drawing Sheets

REDUCING POWER CONSUMPTION BY PREVENTING MEMORY IMAGE DESTAGING TO A NONVOLATILE MEMORY DEVICE

TECHNICAL FIELD

The present disclosure relates generally to power consumption of user devices. More specifically, but not by way of limitation, this disclosure relates to reducing power consumption by preventing memory image destaging to a nonvolatile memory device.

BACKGROUND

User devices, such as mobile phones, laptop computers, and desktop computer, often include a dynamic random access memory (DRAM) and a solid-state drive (SSD) for storing data. Data in the DRAM can be destaged to the SSD, for example, when the user device enters a power-save mode. An SSD is organized into blocks, with each block including a number of pages made up of a row of cells. SSDs read and write data as pages, but erase data at the block level. Once a block is erased, new data can be written to the cells of the block. A block can be written and erased a predefined amount of time before the SSD fails. For example, an SSD may be limited to writing and erasing a block 1000 times.

DETAILED DESCRIPTION

Figure 1:
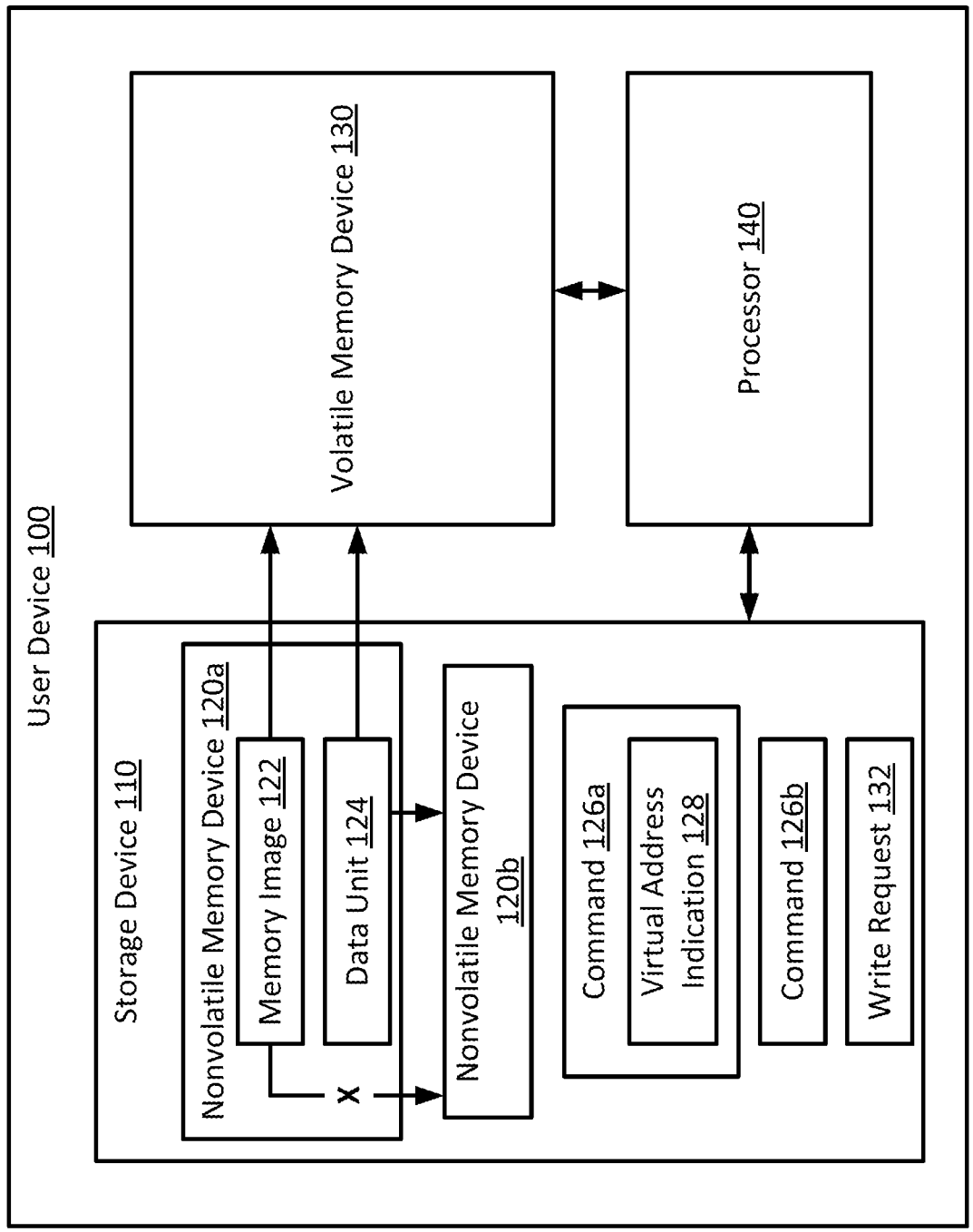
FIG. 1 is a block diagram of an example of a system for implementing preventing memory image destaging to a nonvolatile memory device according to some aspects of the present disclosure.

User devices regularly switch between power modes. For example, a user device may operate in a higher power mode when the user device is interacted with to perform operations and may operate at a lower power mode when the user device is turned off in an idle state. Typically, when a user device enters the lower power mode, a memory image of data for the user device is stored in a solid-state drive (SSD) and power is turned off to the memory device, such as a dynamic random access memory (DRAM) device. When power resumes, the memory image is read from the SSD into the memory device and operations continue from the previous state. Each time the memory image is stored to the SSD, a part of the erase cycles for the SSD are consumed, which are typically limited to fewer than one-thousand erase cycles. An SSD may include a caching layer of a storage class memory (SCM) that is faster than the underlying SSD, nonvolatile, and capable of virtually unlimited erase cycles.

A write to the SSD can first be stored in the SCM cache for fast response time and to help mitigate write amplification. But, the write is eventually destaged to the SSD to free up space for additional writes. The cycle of storing a memory image to the SSD and restoring the memory image to the DRAM can result in unnecessary writes to the SSD. For a user device, it may be beneficial to enter the lower power mode each time the screen is turned off and to resume the higher power mode when the screen is turned on. Taking into account the frequency of a user turning on and off the screen of the user device and a size of the memory device, the number of cycles of storing and restoring the memory image increases quickly. For example, if the user turns off and on the screen sixty times in one day and the DRAM is eight GB, there are four-hundred eighty GB of store and restore data in one day. As a result, a two-hundred fifty GB SSD may be rewritten at least twice a day, which may be increased due to write amplification. The erase cycles may additionally consumed within one year by storing and restoring the memory image, which does not take into account other processes. To mitigate erase cycle usage, user devices may wait a predetermined time after the screen is turned off to enter the lower power mode to skip saving the memory image for situations in which there is a short delay between the turning off and turning on of the screen.

Some examples of the present disclosure can overcome one or more of the abovementioned problems by providing a system that can store the memory image in a first nonvolatile memory device and prevent the memory image from being destaged to a second nonvolatile memory device during a lower power mode. The first nonvolatile memory device can perform a caching function and may be an SCM device. After being in the lower power mode with the memory image stored in the first nonvolatile memory device, the system can enter the higher power mode. A command can be generated to store the memory image in a volatile memory device, such as a DRAM, and to prevent the memory image from being stored in the second nonvolatile memory device. As a result, each time the system enters the lower power mode, the memory image can be moved to the first nonvolatile memory device and then restored to the volatile memory device when the system enters the higher power mode. Thus, write amplification and erase-cycle usage of the second nonvolatile memory device can be reduced. In addition, power consumption can be reduced since the system can enter the lower power mode each time a screen of the system is turned off, and not only after the screen remains off for a predetermined length of time.

As an example, a screen of a mobile phone can be turned off, so the mobile phone can be considered to be in a power-save mode. The mobile device can include a DRAM device as a volatile memory device and a storage device that includes two nonvolatile memory devices: an SCM device that performs a caching function and an SSD. To enter the power-save mode, a command can be generated to store a memory image in the SCM device. The command can also prevent the memory image from being destaged to the SSD. The screen of the mobile phone can then be turned on, and the mobile phone can enter a full-power mode. Another command can be generated to restore the memory image to the DRAM. The other command can also prevent the memory image from being stored in the SSD. As a result of bypassing the SSD, storing and restoring cycles for the memory image can reduce write amplification and erase-cycle usage of the SSD and also power consumption for the mobile phone.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for implementing preventing memory image destaging to a nonvolatile memory device according to some aspects of the present disclosure. The system can include a user device 100 that can include a storage device 110 and a volatile memory device 130 in communication with a processor 140. Examples of the user device 100 can include a mobile phone, a laptop computer, a tablet, a server, or another user device. The volatile memory device 130 may be a DRAM device. The storage device 110 can include at least two nonvolatile memory devices 120a-b. One of the nonvolatile memory devices, such as the nonvolatile memory device 120a, can perform a caching function. The nonvolatile memory device 120a can be an SCM device. Examples of the nonvolatile memory device 120b can include a hard drive, an SSD, a magnetoresistive random access memory (MRAM) device, etc.

In some examples, the user device 100 can be in a first power mode, such as a power-save mode, meaning that the user device 100 is operating at a lower power level than a full-power mode, which can be a second power mode. In the power-save mode, a memory image 122 of data for processes executed by the user device 100 can be stored in the nonvolatile memory device 120a that performs the caching function. To store the memory image 122 in the nonvolatile memory device 120a, the processor 140 can generate a command 126a for the storage device 110 upon determining the user device 100 is in the power-save mode. The command 126a can indicate the memory image 122 is to be stored in the nonvolatile memory device 120a and can prevent the memory image 122 from being stored in the nonvolatile memory device 120b. The processor 140 can also allocate a virtual address of the nonvolatile memory device 120b in which the memory image 122 can be stored subsequent to being stored in the nonvolatile memory device 120a. The virtual address can be included in the command 126a as a virtual address indication 128. But, the virtual address may not exist in the nonvolatile memory device 120b. For example, the nonvolatile memory device 120b may be an SSD with 256 GB and the processor 140 may allocate the virtual address to be higher than an address available in the 256 GB. As a result, the memory image 122 can remain in the nonvolatile memory device 120a and not be moved to the nonvolatile memory device 120b.

Additionally, during the power-save mode, the user device 100 can be in a state in which no processes are executing on the user device 100. As a result, no additional writes can be received that would use the nonvolatile memory device 120a. So, the memory image 122 can be stored in the nonvolatile memory device 120a without subsequently being destaged to the nonvolatile memory device 120b.

At some point in time subsequent to the user device 100 being in the power-save mode, the processor 140 can determine that the user device 100 is in the full-power mode. In response, the processor 140 can generate a command 126b to store the memory image 122 in the volatile memory device 130. The command 126b can also prevent the memory image 122 from being stored in the nonvolatile memory device 120b. The processor 140 can then read the memory image 122 from the nonvolatile memory device 120a into the volatile memory device 130. The processor 140 can also remove the memory image 122 from the nonvolatile memory device 120a based on the command 126b in response to the memory image 122 being stored in the volatile memory device 130. As a result, the space that the memory image 122 was occupying in the nonvolatile memory device 120a can become available for other data. The space in the nonvolatile memory device 120a becomes available without the memory image 122 being destaged to the nonvolatile memory device 120b.

The nonvolatile memory device 120b may be able to store data that is not the memory image 122 while the user device 100 is in the full-power mode or in the power-save mode. For example, while the user device 100 is in the full-power mode, the processor 140 can receive a write request 132 for a data unit 124. The processor 140 can initially store the data unit 124 in the nonvolatile memory device 120a. After a predetermined length of time passes from storing the data unit 124 in the nonvolatile memory device 120a, or once the nonvolatile memory device 120a is full, the processor 140 can move the data unit 124 to the nonvolatile memory device 120b.

FIG. 1 is illustrative and non-limiting. Other examples may include more components, fewer components, different components, or a different arrangement of the components shown in FIG. 1. For example, although the user device 100 includes one storage device in the example of FIG. 1, the user device 100 may include a larger number of storage devices in other examples. Additionally, while FIG. 1 is described with respect to a power-save mode and a full-power mode, the prevention of destaging to the nonvolatile memory device 120b may be used for any process that produces data that does not have to be maintained long term. For example, the prevention of destaging to the nonvolatile memory device 120b may be used for a build process, image processing, data mining, etc.

Figure 2:
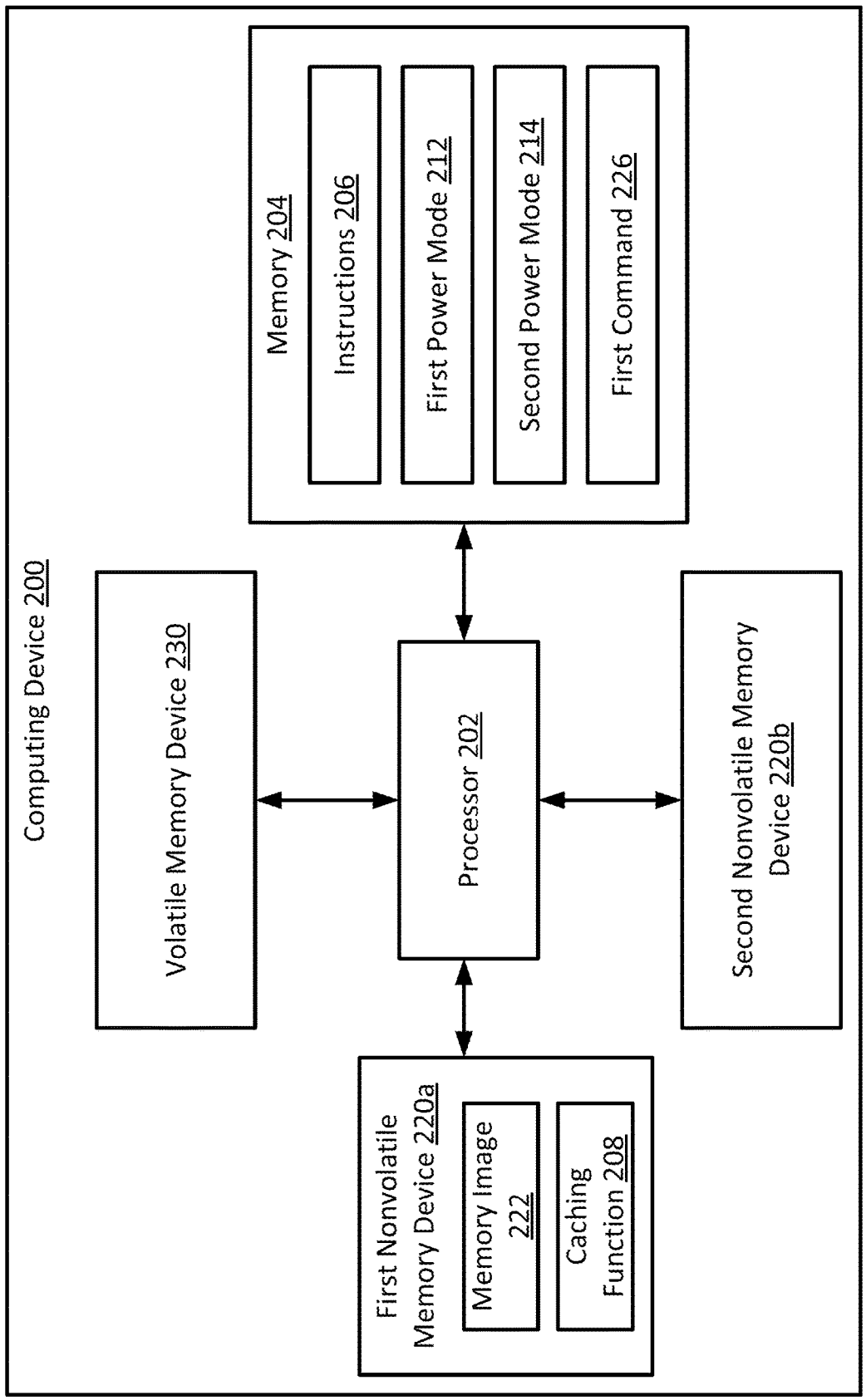
FIG. 2 is a block diagram of another system for implementing preventing memory image destaging to a nonvolatile memory device according to some aspects of the present disclosure.

FIG. 2 is a block diagram of another system for implementing preventing memory image destaging to a nonvolatile memory device according to some aspects of the present disclosure. The system includes a computing device 200 that is communicatively coupled to a processor 202 and a memory 204. The processor 202 and the memory 204 may be part of the computing device 200. The processor 202 may be the processor 140 from FIG. 1.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 may include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the processor 202 can execute the instructions 206 to perform operations. For example, the processor 202 can determine, subsequent to the computing device 200 being in a first power mode 212 and having a memory image 222 stored in a first nonvolatile memory device 220a that performs a caching function 208, that the computing device 200 is in a second power mode 214 that is a higher power mode than the first power mode 212. The first nonvolatile memory device 220a may be an SCM device that is included in a storage device, such as the storage device 110 in FIG. 1. The processor 202 can, in response to determining that the computing device 200 is in the second power mode 214, generate a first command 226 to store the memory image 222 in a volatile memory device 230 and to prevent the memory image 222 from being stored in a second nonvolatile memory device 220b. The volatile memory device 230 can be a DRAM device and the second nonvolatile memory device 220b can be an SSD. The first command 226 can ensure that the memory image 222 is not destaged to the second nonvolatile memory device 220b, and thus reduce write amplification and erase-cycle usage involved with moving data to and from the second nonvolatile memory device 220b.

Figure 3:
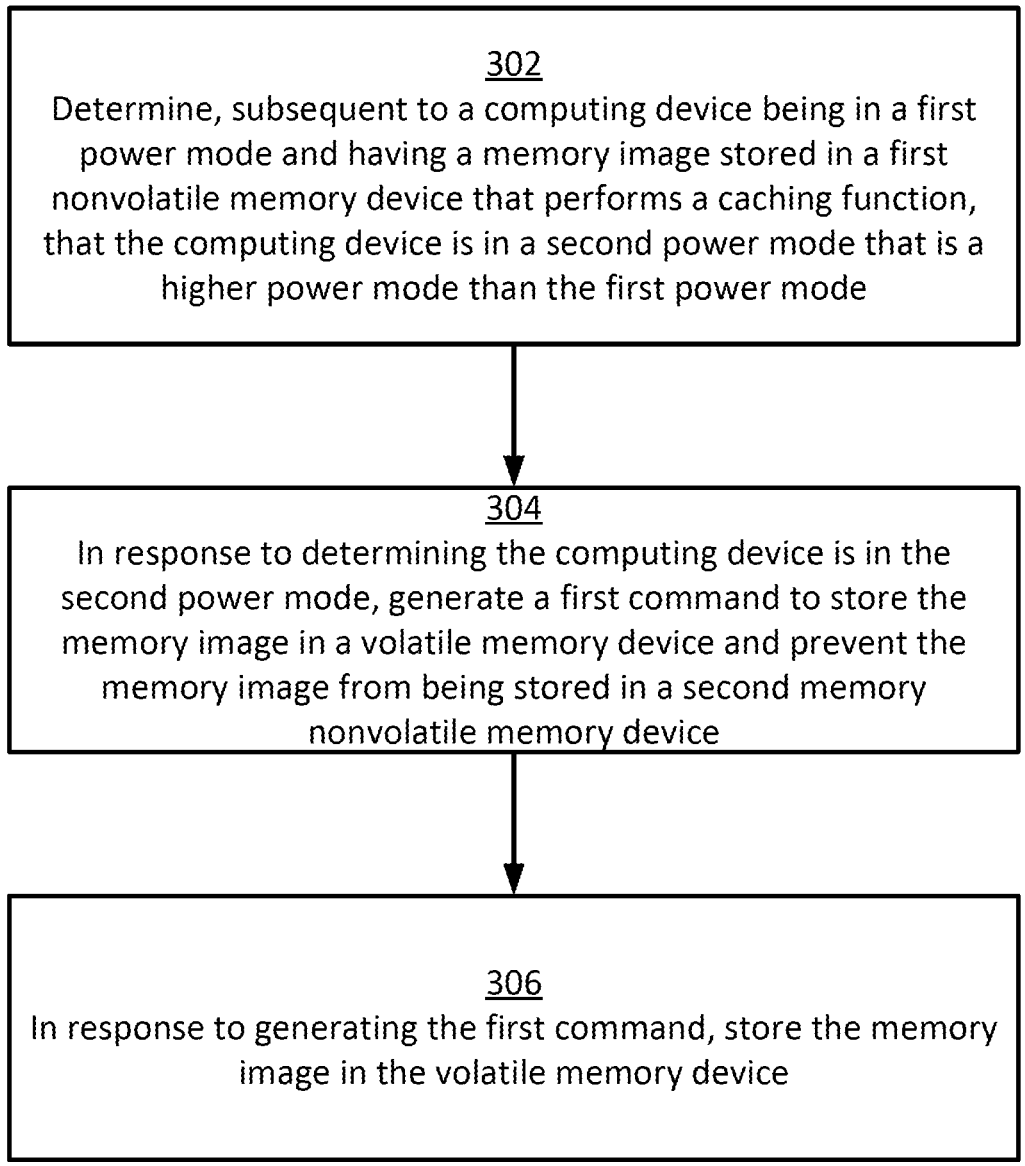
FIG. 3 is a flowchart of a process for implementing preventing memory image destaging to a nonvolatile memory device according to some aspects of the present disclosure.

FIG. 3 is a flowchart of a process for implementing preventing memory image destaging to a nonvolatile memory device according to some aspects of the present disclosure. The processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 determines, subsequent to the computing device 200 being in a first power mode 212 and having a memory image 222 stored in a first nonvolatile memory device 220a that performs a caching function 208, that the computing device 200 is in a second power mode 214. The second power mode 214 can be a higher power mode than the first power mode 212. For example, the first power mode 212 may be a power-save mode and the second power mode 214 may be a full-power mode. The first nonvolatile memory device 220a may be an SCM device. The memory image 222 can be stored in the first nonvolatile memory device 220a based on a command generated by the processor 202. The command can include an indication of a virtual address for the second nonvolatile memory device 220b in which the memory image 222 is to be stored subsequent to being stored in the first nonvolatile memory device 220a. But, the second nonvolatile memory device 220b can exclude the virtual address, so the memory image 222 may not be stored in the second nonvolatile memory device 220b. Additionally or alternatively, the command may include a time length for which the memory image 222 is to be in the first nonvolatile memory device 220a before being moved to the second nonvolatile memory device 220b. To prevent the memory image 222 from being moved to the second nonvolatile memory device 220b, the time length can be indicated to be infinite. The first nonvolatile memory device 220a and the second nonvolatile memory device 220b may be part of a storage device in communication with the processor 202 and the volatile memory device 230.

In block 304, the processor 202, in response to determining that the computing device 200 is in the second power mode 214, generates a first command 226 to store the memory image 222 in the volatile memory device 230. The first command 226 can also prevent the memory image 222 from being stored in the second nonvolatile memory device 220b. The first command 226 may designate an address of the volatile memory device 230 for the memory image 222 to be stored in. The first command 226 may additionally include a virtual address of the second nonvolatile memory device 220b that the second nonvolatile memory device 220b does not include, so the memory image 222 may not be stored in the second nonvolatile memory device 220b. As a result, the memory image 222 can be moved between the volatile memory device 230 and the first nonvolatile memory device 220a without being stored in the second nonvolatile memory device 220b. But, in the second power mode 214, data may be written to and read from the second nonvolatile memory device 220b.

In block 306, the processor 202, in response to generating the first command 226, stores the memory image 222 in the volatile memory device 230. The processor 202 can read the memory image 222 from the first nonvolatile memory device 220a into the volatile memory device 230. Operations of the computing device 200 can then be resumed using the memory image 222 in the volatile memory device 230. The processor 202 can also remove the memory image 222 from the first nonvolatile memory device 220a based on the first command 226 in response to the memory image 222 being stored in the volatile memory device 230. As a result, the space that the memory image 222 was occupying in the first nonvolatile memory device 220a can become available for other data without the memory image 222 being destaged to the second nonvolatile memory device 220b.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

What is claimed is:

1. A system comprising:
   a processor; and
   a memory including instructions that are executable by the processor for causing the processor to:
   determine, subsequent to a computing device being in a first power mode and having a memory image stored in a first nonvolatile memory device that performs a caching function, that the computing device is in a second power mode that is a higher power mode than the first power mode;
   in response to determining that the computing device is in the second power mode, generate a first command to store the memory image in a volatile memory device and prevent the memory image from being stored in a second nonvolatile memory device; and
   in response to generating the first command, store the memory image in the volatile memory device and remove the memory image from the first nonvolatile memory device in response to the memory image being stored in the volatile memory device.

2. The system of claim 1, wherein the memory further includes instructions that are executable by the processor for causing the processor to, prior to determining the computing device is in the second power mode:
   determine the computing device is in the first power mode; and
   in response to determining that the computing device is in the first power mode, generate a second command to store the memory image in the first nonvolatile memory device, the first command preventing the memory image from being stored in the second nonvolatile memory device.

3. The system of claim 1, wherein the memory further includes instructions that are executable by the processor for causing the processor to prevent the memory image from being stored in the second nonvolatile memory device by allocating a virtual address of the second nonvolatile memory device for storing the memory image, the second nonvolatile memory device excluding the virtual address.

4. The system of claim 1, wherein the memory further includes instructions that are executable by the processor for causing the processor to, subsequent to storing the memory image in the volatile memory device:
receive a write request for a data unit;
in response to receiving the write request, store the data unit in the first nonvolatile memory device; and
subsequent to a predetermined length of time passing, store the data unit in the second nonvolatile memory device.

5. The system of claim 1, wherein the computing device comprises a storage device including the first nonvolatile memory device and the second nonvolatile memory device.

6. The system of claim 1, wherein the first nonvolatile memory device comprises a storage class memory and the second nonvolatile memory device comprises a solid-state drive.

7. A method comprising:
determining, subsequent to a computing device being in a first power mode and having a memory image stored in a first nonvolatile memory device that performs a caching function, that the computing device is in a second power mode that is a higher power mode than the first power mode;
in response to determining that the computing device is in the second power mode, generating a first command to store the memory image in a volatile memory device and prevent the memory image from being stored in a second nonvolatile memory device; and
in response to generating the first command, storing the memory image in the volatile memory device and removing the memory image from the first nonvolatile memory device in response to the memory image being stored in the volatile memory device.

8. The method of claim 7, further comprising, prior to determining the computing device is in the second power mode:
determine the computing device is in the first power mode; and
in response to determining that the computing device is in the first power mode, generate a second command to store the memory image in the first nonvolatile memory device, the first command preventing the memory image from being stored in the second nonvolatile memory device.

9. The method of claim 7, further comprising:
preventing the memory image from being stored in the second nonvolatile memory device by allocating a virtual address of the second nonvolatile memory device for storing the memory image, the second nonvolatile memory device excluding the virtual address.

10. The method of claim 7, further comprising, subsequent to storing the memory image in the volatile memory device:
receive a write request for a data unit;
in response to receiving the write request, store the data unit in the first nonvolatile memory device; and
subsequent to a predetermined length of time passing, store the data unit in the second nonvolatile memory device.

11. The method of claim 7, wherein the computing device comprises a storage device including the first nonvolatile memory device and the second nonvolatile memory device.

12. The method of claim 7, wherein the first nonvolatile memory device comprises a storage class memory and the second nonvolatile memory device comprises a solid-state drive.

13. A non-transitory computer-readable medium comprising program code that is executable by a processor for causing the processor to:
determine, subsequent to a computing device being in a first power mode and having a memory image stored in a first nonvolatile memory device that performs a caching function, that the computing device is in a second power mode that is a higher power mode than the first power mode;
in response to determining that the computing device is in the second power mode, generate a first command to store the memory image in a volatile memory device and prevent the memory image from being stored in a second nonvolatile memory device; and
in response to generating the first command, store the memory image in the volatile memory device and remove the memory image from the first nonvolatile memory device in response to the memory image being stored in the volatile memory device.

14. The non-transitory computer-readable medium of claim 13, further comprising program code that is executable by the processor for causing the processor to, prior to determining the computing device is in the second power mode:
determine the computing device is in the first power mode; and
in response to determining that the computing device is in the first power mode, generate a second command to store the memory image in the first nonvolatile memory device, the first command preventing the memory image from being stored in the second nonvolatile memory device.

15. The non-transitory computer-readable medium of claim 13, further comprising program code that is executable by the processor for causing the processor to prevent the memory image from being stored in the second nonvolatile memory device by allocating a virtual address of the second nonvolatile memory device for storing the memory image, the second nonvolatile memory device excluding the virtual address.

16. The non-transitory computer-readable medium of claim 13, further comprising program code that is executable by the processor for causing the processor to, subsequent to storing the memory image in the volatile memory device:
receive a write request for a data unit;
in response to receiving the write request, store the data unit in the first nonvolatile memory device; and
subsequent to a predetermined length of time passing, store the data unit in the second nonvolatile memory device.

17. The non-transitory computer-readable medium of claim 13, wherein the first nonvolatile memory device comprises a storage class memory and the second nonvolatile memory device comprises a solid-state drive.

* * * * *